United States Patent
Park et al.

(10) Patent No.: US 12,261,263 B2
(45) Date of Patent: Mar. 25, 2025

(54) LITHIUM SECONDARY BATTERY

(71) Applicant: LG Energy Solution, Ltd., Seoul (KR)

(72) Inventors: Byung Chun Park, Daejeon (KR); Yo Han Kwon, Daejeon (KR); Je Young Kim, Daejeon (KR); Seok Koo Kim, Daejeon (KR); Wang Mo Jung, Daejeon (KR); Yong Ju Lee, Daejeon (KR); Chul Haeng Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 18/276,557

(22) PCT Filed: Jul. 21, 2022

(86) PCT No.: PCT/KR2022/010679
§ 371 (c)(1),
(2) Date: Aug. 9, 2023

(87) PCT Pub. No.: WO2023/003378
PCT Pub. Date: Jan. 26, 2023

(65) Prior Publication Data
US 2024/0047731 A1     Feb. 8, 2024

(30) Foreign Application Priority Data

Jul. 21, 2021  (KR) .................. 10-2021-0095985
Jul. 20, 2022  (KR) .................. 10-2022-0089894

(51) Int. Cl.
*H01M 10/0525*     (2010.01)
*H01M 4/131*     (2010.01)
(Continued)

(52) U.S. Cl.
CPC ....... *H01M 10/0525* (2013.01); *H01M 4/131* (2013.01); *H01M 4/134* (2013.01);
(Continued)

(58) Field of Classification Search
CPC ...... H01M 4/131; H01M 4/134; H01M 4/505; H01M 4/525; H01M 4/623; H01M 4/0525; H01M 2004/027; H01M 2004/028
See application file for complete search history.

(56) References Cited

U.S. PATENT DOCUMENTS 9,246,162 B2   1/2016  Choi et al.
2008/0070119 A1  3/2008  Miura et al.
(Continued)

FOREIGN PATENT DOCUMENTS

CN   106564967 B   6/2018
CN   111213264 A   5/2020
(Continued)

OTHER PUBLICATIONS

International Search Report for PCT/KR2022/010679 mailed Nov. 1, 2022. 3 pages.
(Continued)

*Primary Examiner* — Christopher P Domone
(74) *Attorney, Agent, or Firm* — Lerner David LLP

(57) ABSTRACT

A lithium secondary battery includes a positive electrode, a negative electrode, a separator, and an electrolyte, wherein the positive electrode includes a positive electrode active material layer having a positive electrode active material containing an overlithiated manganese-based oxide represented by Formula 1 below, and the negative electrode includes a negative electrode active material layer having a silicon-based negative electrode active material, $$Li_a Ni_b Co_c Mn_d M_e O_2 \qquad \text{[Formula 1]}$$

wherein, M is at least one selected from the group consisting of Al, B, Co, W, Mg, V, Ti, Zn, Ga, In, Ru, Nb, Sn, Sr, and Zr, and $1<a$, $0\le b\le 0.5$, $0\le c\le 0.1$,
(Continued)

$0.5 \leq d < 1.0$, and $0 \leq e \leq 0.2$, and. Preferably, in the Formula 1, $1.1 \leq a \leq 1.5$, $0.1 \leq b \leq 0.4$, $0 \leq c \leq 0.05$, $0.5 \leq d \leq 0.80$, and $0 \leq e \leq 0.1$.

15 Claims, 3 Drawing Sheets

(51) Int. Cl.
  *H01M 4/134* (2010.01)
  *H01M 4/62* (2006.01)
  *H01M 4/02* (2006.01)

(52) U.S. Cl.
  CPC ...... *H01M 4/623* (2013.01); *H01M 2004/027* (2013.01); *H01M 2004/028* (2013.01)

(56) References Cited

U.S. PATENT DOCUMENTS

| | | | |
|---|---|---|---|
| 2013/0330612 A1 | 12/2013 | Choi et al. | |
| 2016/0006031 A1 | 1/2016 | Kaseda et al. | |
| 2016/0149205 A1* | 5/2016 | Theivanayagam | H01M 4/0435 429/221 |
| 2016/0190555 A1 | 6/2016 | Kapylou et al. | |
| 2016/0359197 A1 | 12/2016 | Watarai et al. | |
| 2017/0040602 A1 | 2/2017 | Ha et al. | |
| 2017/0194627 A1* | 7/2017 | Deng | H01B 1/122 |
| 2018/0254473 A1 | 9/2018 | Lim et al. | |
| 2019/0363396 A1 | 11/2019 | Hasegawa | |
| 2019/0386294 A1 | 12/2019 | Han et al. | |
| 2020/0083524 A1 | 3/2020 | Baek et al. | |
| 2020/0119341 A1 | 4/2020 | Baek et al. | |
| 2020/0321615 A1 | 10/2020 | Shin et al. | |
| 2020/0328409 A1* | 10/2020 | Ito | H01M 4/131 |
| 2020/0343536 A1 | 10/2020 | Suh et al. | |
| 2020/0381718 A1 | 12/2020 | Roberts et al. | |
| 2021/0070630 A1 | 3/2021 | Tarascon et al. | |
| 2021/0119208 A1* | 4/2021 | Choi | C01G 53/006 |
| 2021/0376323 A1* | 12/2021 | Kwon | H01M 4/0416 |
| 2022/0013766 A1 | 1/2022 | Kim et al. | |
| 2022/0371911 A1* | 11/2022 | Wang | C01G 45/1228 |
| 2023/0246186 A1 | 8/2023 | Shin et al. | |

FOREIGN PATENT DOCUMENTS

| | | |
|---|---|---|
| CN | 111491896 A | 8/2020 |
| CN | 111512480 A | 8/2020 |
| CN | 112310343 A | 2/2021 |
| CN | 108172823 B | 5/2021 |
| CN | 112803022 A | 5/2021 |
| CN | 111446444 B | 6/2021 |
| EP | 4047692 A2 | 8/2022 |
| JP | 2009158415 A | 7/2009 |
| JP | 2013179040 A | 9/2013 |
| JP | 2014063707 A | 4/2014 |
| JP | 2019061751 A | 4/2019 |
| KR | 20120118435 A | 10/2012 |
| KR | 20140105753 A | 9/2014 |
| KR | 20150069334 A | 6/2015 |
| KR | 20160080865 A | 7/2016 |
| KR | 20160125978 A | 11/2016 |
| KR | 20160135525 A | 11/2016 |
| KR | 20170018208 A | 2/2017 |
| KR | 20200018147 A | 2/2020 |
| KR | 20200065625 A | 6/2020 |
| KR | 20200089182 A | 7/2020 |
| KR | 20210046523 A | 4/2021 |
| WO | 2018051675 A1 | 3/2018 |
| WO | 2019167581 A1 | 9/2019 |
| WO | WO2020105975 * | 5/2020 |
| WO | 2020185013 A1 | 9/2020 |

OTHER PUBLICATIONS

Written Opinion of the International Searching Authority for PCT/KR2022/010679 mailed Nov. 1, 2022. 3 pages.
Extended European Search Report including Written Opinion for Application No. 22846248.7 dated Mar. 15, 2024, pp. 1-7.

* cited by examiner

[FIG.1]
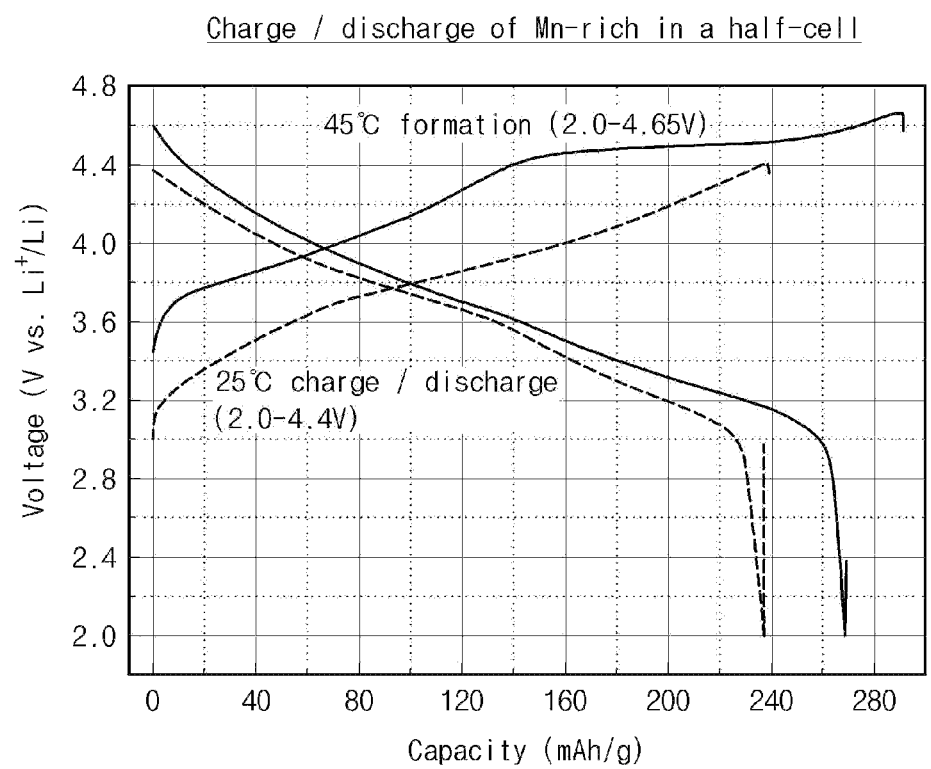

[FIG.2]
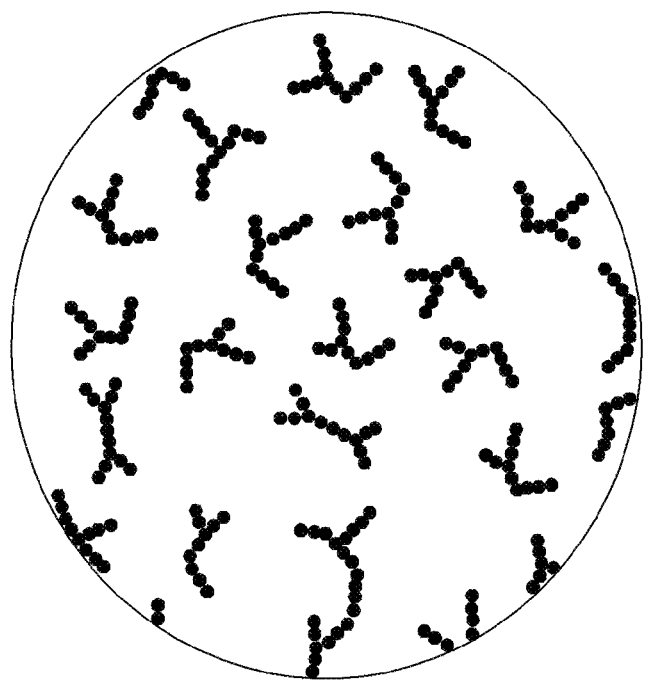

[FIG.3]
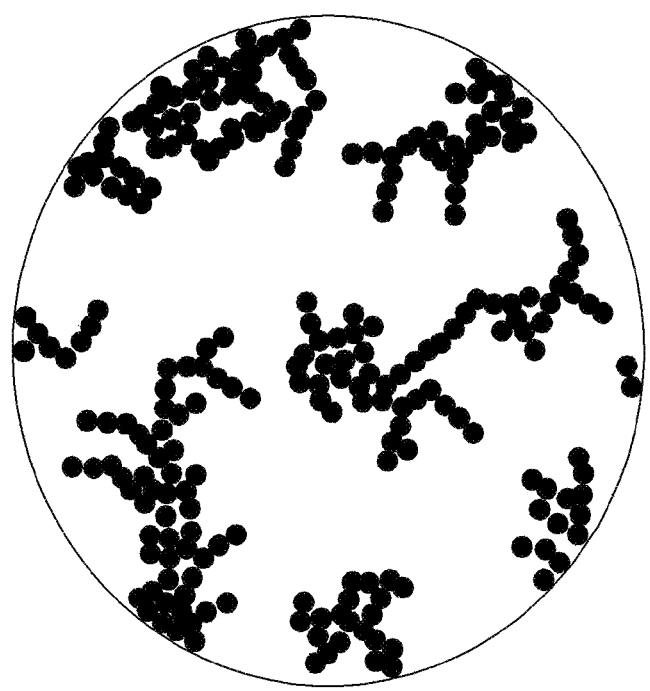

LITHIUM SECONDARY BATTERY

CROSS-REFERENCE TO RELATED APPLICATIONS

This application is a national phase entry under 35 U.S.C. § 371 of International Application No. PCT/KR2022/010679, filed on Jul. 21, 2022, which claims the priority of Korean Patent Application Nos. 10-2021-0095985 filed on Jul. 21, 2021 and 10-2022-0089894 filed on Jul. 20, 2022 in the Korean Intellectual Property Office, the disclosures of which are incorporated herein by reference.

TECHNICAL FIELD

The present disclosure relates to a lithium secondary battery, and more particularly, to a lithium secondary battery exhibiting excellent quick charging performance, lifespan characteristics, and energy density.

BACKGROUND ART

Recently, with a growing interest in energy storage technology and an extended application of the technology to mobile phones, camcorders, laptops, and electric vehicles, efforts for research on and development of electrochemical devices have been increasingly fleshed out.

There emerges an interest in the development of rechargeable secondary batteries among these electrochemical devices, and, particularly, lithium secondary batteries developed in the early 1990's are spotlighted by virtue of their high operating voltage and significantly greater energy density.

Lithium secondary batteries are generally prepared through a method as follows. An electrode assembly is formed by disposing a separator between a positive electrode including a positive electrode active material formed of a transition metal oxide containing lithium and a negative electrode including a negative electrode active material capable of storing lithium ions, inserting the electrode assembly into a battery case, injecting a non-aqueous electrolyte that becomes a medium for delivering lithium ions, and then sealing the battery case. The non-aqueous electrolyte is generally composed of a lithium salt and an organic solvent capable of dissolving the lithium salt.

Recently, a rising demand for secondary batteries having a high energy density, such as batteries for electric vehicles brings with it active development of high voltage secondary batteries driven at a high voltage. In addition, studies are being made to apply silicon-based negative electrode active materials having excellent capacity to obtain higher capacity.

Lithium secondary batteries for vehicles, which have been developed to date predominantly use lithium nickel-based oxide as a positive electrode active material, and when the lithium nickel-based oxide is applied, issues such as structural collapse of a positive electrode active material at high voltage, transition metal elution, gas generation, and the like are caused. In addition, sacrificial positive electrode materials are used to compensate for high irreversible capacity of silicon-based negative electrode active materials when the silicon-based negative electrode active materials are applied, and in this case, an amount of a positive electrode active material included in a positive electrode is reduced, thereby decreasing battery capacity.

Meanwhile, there is a growing demand for lithium secondary batteries exhibiting excellent quick charging performance to shorten charging time, which serves as the biggest stumbling block to commercialization of electric vehicles. However, the quick charging batteries developed so far fail to provide satisfactory performance when it comes to lifespan or energy density.

Accordingly, there remains a need for development of lithium secondary batteries exhibiting excellent quick charging performance along with minimized deterioration in lifespan and energy density.

DISCLOSURE

Technical Problem

An aspect of the present disclosure provides a lithium secondary battery exhibiting excellent quick charging performance, lifespan characteristics, and energy density by applying an overlithiated manganese-based oxide having a low cobalt content, and a silicon-based negative electrode active material.

Technical Solution

According to an aspect of the present disclosure, there is provided a lithium secondary battery including a positive electrode, a negative electrode, a separator, and an electrolyte, wherein the positive electrode includes a positive electrode active material layer having a positive electrode active material containing an overlithiated manganese-based oxide represented by Formula 1 below, and the negative electrode includes a negative electrode active material layer having a silicon-based negative electrode active material.

$$Li_aNi_bCo_cMn_dM_eO_2 \quad \text{[Formula 1]}$$

In Formula 1 above, $1<a$, $0 \leq b \leq 0.5$, $0 \leq c \leq 0.1$, $0.5 \leq d<1.0$, and $0 \leq e \leq 0.2$ are satisfied, and M is at least one selected from the group consisting of Al, B, Co, W, Mg, V, Ti, Zn, Ga, In, Ru, Nb, Sn, Sr, and Zr. Preferably, in Formula 1 above, $1.1 \leq a \leq 1.5$, $0.1 \leq b \leq 0.4$, $0 \leq c \leq 0.05$, $0.5 \leq d \leq 0.80$, and $0 \leq e \leq 0.1$ may be satisfied.

Meanwhile, the overlithiated manganese-based oxide may be a mixture of a $Li_2MnO_3$ phase having a rock salt structure and a $LiM'O_2$ phase having a layered structure, and for example, may be represented by Formula 2 below.

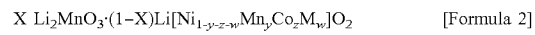

$$X\,Li_2MnO_3 \cdot (1-X)Li[Ni_{1-y-z-w}Mn_yCo_zM_w]O_2 \quad \text{[Formula 2]}$$

In Formula 2 above,

M is at least one selected from the group consisting of Al, B, Co, W, Mg, V, Ti, Zn, Ga, In, Ru, Nb, Sn, Sr, and Zr, and $0.1 \leq X \leq 0.5$, $0.4 \leq y<1$, $0 \leq z \leq 0.1$, and $0 \leq w \leq 0.2$ are satisfied.

Preferably, the positive electrode active material may have a D50 of 2 μm to 10 μm, and a BET specific surface area of 3 m²/g to 8 m²/g.

The lithium secondary battery has an energy density of 500 Wh/L or greater, and requires 20 minutes or less for rapid charging up to 80% SOC.

Advantageous Effects

An aspect of the present disclosure uses an overlithiated manganese-based oxide in which a $Li_2MnO_3$ phase having a rock salt structure and a $LiMO_2$ phase having a layered structure (where M is Ni, Co, Mn) are mixed as a positive electrode active material and uses a silicon-based negative electrode active material as a negative electrode active material, and may thus enable excess lithium generated from the $Li_2MnO_3$ phase in an activation process to compensate for irreversible capacity of the silicon-based negative electrode active material. Therefore, in a lithium secondary battery of the present disclosure, the use of a sacrificial positive electrode material for the negative electrode compensation or pre-lithiation may be minimized, thereby maximizing positive electrode capacity.

In addition, another aspect of the present disclosure uses an overlithiated manganese-based oxide having a low Co content of 10 mol % or less as a positive electrode active material to reduce the use of high-priced Co, leading to reduction in production costs, reduces an oxygen-redox reaction to suppress gas generation and positive electrode degradation and reduce non-uniformity in reaction with a negative electrode, and may thus obtain a secondary battery exhibiting excellent lifespan characteristics, quick charging performance, and energy density.

In addition, the overlithiated nickel manganese cobalt oxide is stably driven even at a relatively high voltage compared to a lithium nickel cobalt manganese oxide, and accordingly, when a positive electrode active material containing an overlithiated manganese-based oxide, and a silicon-based negative electrode active material are used together, high energy density may be achieved by increasing driving voltage.

In addition, the lithium secondary battery of the present disclosure includes a silicon-based negative electrode active material having excellent capacity and rate characteristics as a negative electrode active material, and thus exhibit excellent energy density and quick charging performance.

BRIEF DESCRIPTION OF THE DRAWINGS

FIG. 1 is a charge/discharge profile of a half-cell manufactured using a positive electrode that uses $Li_{1.143}[Ni_{0.33}Mn_{0.67}]_{0.857}O_2$ as a positive electrode active material;

FIG. 2 is an image showing formation of a conductive path on a surface of a negative electrode active material when a single-walled carbon nanotube is used as a conductive material; and FIG. 3 is an image showing formation of a conductive path on a surface of a negative electrode active material when a multi-walled carbon nanotube is used as a conductive material.

DETAILED DESCRIPTION

It will be understood that words or terms used in the specification and claims of the present disclosure shall not be construed as being limited to having the meaning defined in commonly used dictionaries. It will be further understood that the words or terms should be interpreted as having meanings that are consistent with their meanings in the context of the relevant art and the technical idea of the disclosure, based on the principle that an inventor may properly define the meaning of the words or terms to best explain the disclosure.

In the present disclosure, the term "primary particle" indicates a particle unit having no observable grain boundaries when observed in a visual field of 5000 to 20000 magnification, using a scanning electron microscope. The term "average particle diameter of primary particles" indicates an arithmetic mean value calculated after measuring particle diameters of primary particles observed in scanning electron microscope images.

In the present disclosure, the term "secondary particle" is a particle in which a plurality of primary particles are aggregated.

In the present disclosure, the term "average particle diameter $D_{50}$" indicates a particle size with respect to 50% in the volume accumulated particle size distribution of positive electrode active material powder. The average particle diameter $D_{50}$ may be measured by using a laser diffraction method. For example, when it comes to measuring the "average particle diameter $D_{50}$", the positive electrode active material powder is dispersed in a dispersion medium, the dispersion medium is introduced into a commercial laser diffraction particle size measurement instrument (e.g., Microtrac MT 3000) and irradiated with ultrasonic waves having a frequency of about 28 kHz and an output of 60 W to obtain a volume accumulated particle size distribution graph, and the particle diameter at 50% of the volume accumulation may then be calculated.

Hereinafter, the present disclosure will be described in detail.

The present inventors have intensively studied to discover that a lithium secondary battery exhibiting improved quick charging performance and minimized deterioration in lifespan characteristics and energy density may be obtained by using an overlithiated manganese-based oxide having a Co content of 10 mol % or less as a positive electrode active material and using a silicon-based negative electrode active material as a negative electrode active material, and have completed the present disclosure.

To be specific, a lithium secondary battery according to the present disclosure includes a positive electrode, a negative electrode, a separator, and an electrolyte, wherein the positive electrode includes a positive electrode active material layer having a positive electrode active material containing an overlithiated manganese-based oxide represented by Formula 1 below, and the negative electrode includes a negative electrode active material layer having a silicon-based negative electrode active material.

$Li_aNi_bCo_cMn_dM_eO_2$  [Formula 1]

In Formula 1 above, $1<a$, $0\leq b\leq 0.5$, $0\leq c\leq 0.1$, $0.5\leq d<1.0$, and $0\leq e\leq 0.2$ are satisfied, and M is at least one selected from the group consisting of Al, B, Co, W, Mg, V, Ti, Zn, Ga, In, Ru, Nb, Sn, Sr, and Zr. Preferably, in Formula 1 above, $1.1\leq a\leq 1.5$, $0.1\leq b\leq 0.4$, $0\leq c\leq 0.05$, $0.5\leq d\leq 0.80$, and $0\leq e\leq 0.1$ may be satisfied.

Hereinafter, each component of the lithium secondary battery according to the present disclosure will be described in detail.

Positive Electrode

A positive electrode according to the present disclosure includes an overlithiated manganese-based oxide represented by Formula 1 as a positive electrode active material. To be specific, the positive electrode of the present disclosure may include a positive electrode collector and a positive electrode active material layer formed on at least one surface of the positive electrode collector, and the positive electrode active material layer may include a positive electrode active material containing an overlithiated manganese-based oxide represented by

$Li_aNi_bCo_cMn_dM_eO_2$  [Formula 1]

In Formula 1 above, M may be at least one selected from the group consisting of Al, B, Co, W, Mg, V, Ti, Zn, Ga, In, Ru, Nb, Sn, Sr, and Zr.

Meanwhile, a is a molar ratio of Li in the overlithiated manganese-based oxide, and may satisfy $1\leq a\leq 1.2$, $1.1\leq a\leq 1.5$, or $1.1\leq a\leq 1.3$. Where a is in the above range, irreversible capacity of an Si-based negative electrode active material may be sufficiently compensated, and high capacity characteristics may be achieved.

b above is a molar ratio of Ni in the overlithiated manganese-based oxide, and may satisfy 0≤b≤0.5, 0.1≤b≤0.4, or 0.2≤b≤0.4.

c above is a molar ratio of Co in the overlithiated manganese-based oxide, and may satisfy 0≤c≤0.1, 0≤c≤0.08, or 0≤c≤0.05. When c is greater than 0.1, high capacity may be hardly achieved, and gas generation and greater degradation of a positive electrode active material may take place, resulting in reduced lifespan.

d above is a molar ratio of Mn in the overlithiated manganese-based oxide, and may satisfy 0.5≤d<1.0, 0.50≤d≤0.80, or 0.50≤d≤0.70. When d is less than 0.5, the proportion of a rock salt phase becomes too small, so that negative electrode irreversible compensation and capacity improvement are insignificant.

e above is a molar ratio of doping element M in the overlithiated manganese-based oxide, and may satisfy 0≤e≤0.2, 0≤e≤0.1, or 0≤e≤0.05. When the doping element content is too high, capacity of an active material may be adversely affected.

The overlithiated manganese-based oxide containing an excess of lithium has a structure in which a layered phase (LiM'O$_2$) and a rock salt phase (Li$_2$MnO$_3$) are mixed, and in an initial activation process, the rock salt phase is activated to generate an excess of lithium ions, thereby compensating for irreversible capacity of a negative electrode, and balance with a silicon-based negative electrode may thus be achieved without a separate compensation material such as a sacrificial positive electrode material or a pre-lithium compensation process such as pre-lithiation. However, upon the activation process of the rock salt phase, an oxygen-redox reaction takes place, generating a large amount of gas, and greater degradation of a positive electrode is caused due to internal cracks in the active material and collapse of a crystal structure to reduce lifespan, and particularly, when the overlithiated manganese-based oxide is applied to a secondary battery to which a Si-based negative electrode active material is applied as a negative electrode active material, lifespan is severely reduced.

The present inventors have intensively studied to discover that when the Co content in the overlithiated manganese-based oxide is controlled to be 10 mol % or less, the reduction of lifespan may be suppressed even in combination with a Si-based negative electrode active material, and have completed the present disclosure.

It is not clear why lifespan is increased when the overlithiated manganese-based oxide having a Co content of 10 mol % or less is applied, but when Co in the layered structure is oxidized, an oxygen-redox reaction tends to increase at high voltage, and accordingly, it is presumed that, when the reaction is minimized, gas generation and degradation of a positive electrode active material are reduced.

Meanwhile, the Si-based negative electrode active material has a faster reaction with lithium than a typical carbon-based negative electrode active material, and thus lithium secondary batteries using a mixture of the Si-based negative electrode active material and the carbon-based negative electrode active material have been proposed to improve quick charging performance. However, in the case of a negative electrode that uses a Si-based negative electrode active material and a carbon-based negative electrode active material together, a non-uniform reaction takes place within a negative electrode due to the difference in reaction rate between the carbon-based negative electrode active material and the Si-based negative electrode active material, and when the reaction non-uniformity increases, lifespan of a secondary battery rapidly deteriorates. Meanwhile, since Co is an element that promotes formation of a layered crystal structure, the layered crystal structure is well developed when the Co content in a positive electrode active material increases, and accordingly, lithium mobility is improved, so that the difference in reaction rate between negative electrode active materials upon charge/discharge becomes more pronounced. Therefore, when the Co content in the overlithiated manganese-based oxide is controlled to be 10 mol % or less as in the present disclosure, the increase in reaction non-uniformity in a negative electrode may be suppressed to improve life characteristics of a secondary battery.

Meanwhile, in the overlithiated manganese-based oxide represented by Formula 1 above, the molar ratio of Li to all metal elements excluding Li (Li/Me) may be 1.2 to 1.5, 1.25 to 1.5, or 1.25 to 1.4. When the Li/Me ratio satisfies the above range, rate characteristics and capacity characteristics are excellent. When the Li/Me ratio is too high, electrical conductivity decreases and a rock salt phase (Li$_2$MnO$_3$) increases, resulting in faster degradation, and when the Li/Me ratio is too low, energy density improvement is insignificant.

Meanwhile, the composition of the overlithiated manganese-based oxide may be represented by Formula 2 below.

$$X\ Li_2MnO_3\cdot(1-X)Li[Ni_{1-y-z-w}Mn_yCo_zM_w]O_2 \qquad \text{[Formula 2]}$$

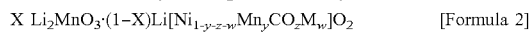

In Formula 2 above, M may be at least one selected from the group consisting of metal ions Al, B, Co, W, Mg, V, Ti, Zn, Ga, In, Ru, Nb, Sn, Sr, and Zr.

X above indicates the ratio of Li$_2$MnO$_3$ phase in the overlithiated manganese-based oxide, and may satisfy 0.25≤X≤0.5, 0.25≤X≤0.5, or 0.25≤X≤0.4. When the ratio of Li$_2$MnO$_3$ phase in the overlithiated manganese-based oxide satisfies the above range, irreversible capacity of an Si-based negative electrode active material may be sufficiently compensated and high capacity characteristics may be obtained.

y above is a molar ratio of Mn in the LiM'O$_2$ layered phase, and may satisfy 0.4−y<1, 0.4≤y≤0.8, or 0.4≤y≤0.7.

z above is a molar ratio of Co in the LiM'O$_2$ layered phase, and may satisfy 0≤z≤0.1, 0≤z≤0.08, or 0≤z≤0.05. When z is greater than 0.1, gas generation and greater degradation of a positive electrode active material may take place, resulting in reduced lifespan.

w above is a molar ratio of doping element M in the LiM'O$_2$ layered phase, and may satisfy 0≤w≤0.2, 0≤w≤0.1, or 0≤w≤0.05.

Meanwhile, the positive electrode active material according to the present disclosure, as needed, may further include a coating layer on a surface of the overlithiated manganese-based oxide. When the positive electrode active material includes a coating layer, the coating layer prevents contact between the overlithiated manganese-based oxide and electrolyte to reduce side reactions of the electrolyte, thereby improving lifespan characteristics.

The coating layer may include a coating element M$^1$, and the coating element M$^1$ may be, for example, at least one selected from the group consisting of Al, B, Co, W, Mg, V, Ti, Zn, Ga, In, Ru, Nb, Sn, Sr, and Zr, preferably Al, Co, Nb, W, and a combination thereof, and more preferably Al, Co, and a combination thereof. Two or more types of the coating element M$^1$ may be included, and for example, Al and Co may be included.

The coating element may be present in the form of an oxide in the coating layer, that is, M$^1$Oz(1≤z≤4).

The coating layer may be formed through a method such as dry coating, wet coating, chemical vapor deposition (CVD), physical vapor deposition (PVD), or atomic layer deposition (ALD). Among them, the coating layer is preferably formed through the atomic layer deposition method that provides formation of a wide coating layer area.

The formation area of the coating layer may be 10% to 100%, preferably 30% to 100%, and more preferably 50% to 100%, with respect to a total surface area of the overlithiated manganese-based particles. When the coating layer formation area satisfies the above range, improvement in lifespan characteristics is significant.

Meanwhile, the positive electrode active material according to the present disclosure may be in the form of secondary particles in which a plurality of primary particles are aggregated, and the average particle diameter $D_{50}$ of the secondary particles may be 2 μm to 10 μm, preferably 2 μm to 8 μm, and more preferably 4 μm to 8 μm. When the $D_{50}$ of the positive electrode active material satisfies the above range, satisfactory electrode density may be obtained, and deterioration in capacity and rate characteristics may be minimized.

In addition, the positive electrode active material may have a BET specific surface area of 1 $m^2/g$ to 10 $m^2/g$, 3 $m^2/g$ to 8 $m^2/g$, or 4 $m^2/g$ to 6 $m^2/g$. When the BET specific surface area of the positive electrode active material is too low, sufficient capacity may be hardly obtained due to insufficient reaction area with electrolyte, and when the specific surface area is too high, moisture absorption is fast and side reactions with the electrolyte are accelerated, making it difficult to secure lifespan characteristics.

In addition, the positive electrode according to the present disclosure preferably has an initial irreversible capacity of about 5% to 70%, 5% to 50%, or 5% to 30%. The initial irreversible capacity of the positive electrode is a value measured with respect to 0.1 C as the percentage of discharge capacity upon charge/discharge in a voltage range of 2.5 V to 4.4 V to charge capacity when activated at a high voltage of 4.6 V or more.

When the initial irreversible capacity of the positive electrode satisfies the above range, the irreversible capacity of a silicon-based negative electrode active material may be sufficiently compensated without using a separate compensation material such as a sacrificial positive electrode material.

As in the present disclosure, when the overlithiated manganese-based oxide represented by Formula 1 above is used as a positive electrode active material, the use of high-priced Co may be reduced to reduce manufacturing costs and obtain a high electrode density. Table 1 below is a table comparing the price of commercially available overlithiated manganese-based oxide positive electrode active materials with the price of NCMA-based positive electrode active materials.

TABLE 1

|  |  | NCMA | overlithiated manganese-based oxide | |
|  |  |  | 1 | 2 |
| --- | --- | --- | --- | --- |
| Composition | Composition [mol %] | Ni 85% NCMA | Ni/Co/Mn = 22/11/67 | Ni/Co/Mn = 33/0/67 |
|  | Price [$/kg] | 7.2 | 4.3 | 3.0 |

As shown in Table 1 above, the price of positive electrode active material 2 having a low Co content is lower than that of NCMA or positive electrode active material 1, and thus, when an overlithiated manganese-based oxide having a low Co content is applied, production costs for lithium secondary batteries may be reduced.

Meanwhile, the overlithiated manganese-based oxide may be prepared by mixing a transition metal precursor with a lithium raw material and then firing the mixture.

The lithium raw material may be, for example, lithium-containing carbonate (e.g., lithium carbonate), hydrate (e.g., lithium hydroxide hydrate (LiOH·$H_2O$), etc.), hydroxide (e.g., lithium hydroxide, etc.), nitrate (e.g., lithium nitrate (LiNO$_3$), etc.), chloride (e.g., lithium chloride (LiCl), etc.), and the like, may be used alone or as a mixture of two or more thereof.

Meanwhile, the transition metal precursor may be in the form of hydroxide, oxide, or carbonate. When a carbonate-type precursor is used, it is more preferable in that a positive electrode active material having a relatively high specific surface area may be obtained.

The transition metal precursor may be prepared through a co-precipitation process. For example, the transition metal precursor may be prepared by dissolving each transition metal-containing raw material in a solvent to prepare a metal solution, and then mixing the metal solution, an ammonium cation complexing agent, and a basic compound, followed by a co-precipitation reaction. In addition, as needed, an oxidizing agent or oxygen gas may be further added upon the co-precipitation reaction.

In this case, the transition metal-containing raw material may be acetate, carbonate, nitrate, sulfate, halide, sulfide, or the like of each transition metal. To be specific, the transition metal-containing raw material may be NiO, NiCO$_3$·2Ni(OH)$_2$·4H$_2$O, NiC$_2$O$_2$·2H$_2$O, Ni(NO$_3$)$_2$·6H$_2$O, NiSO$_4$, NiSO$_4$·6H$_2$O, Mn$_2$O$_3$, MnO$_2$, Mn$_3$O$_4$, MnCO$_3$, Mn(NO$_3$)$_2$, MnSO$_4$·○H$_2$O, manganese acetate, manganese halide, or the like.

The ammonium cation complexing agent may be at least one selected from the group consisting of NH$_4$OH, (NH$_4$)$_2$SO$_4$, NH$_4$NO$_3$, NH$_4$Cl, CH$_3$COONH$_4$, and (NH$_4$)$_2$CO$_3$.

The basic compound may be at least one selected from the group consisting of NaOH, Na$_2$CO$_3$, KOH, and Ca(OH)$_2$. The form of a precursor may vary depending on the type of a basic compound used. For example, when NaOH is used as a basic compound, a hydroxide-type precursor may be obtained, and when Na$_2$CO$_3$ is used as a basic compound, a carbonate-type precursor may be obtained. In addition, when a basic compound and an oxidizing agent are used together, an oxide-type precursor may be obtained.

Meanwhile, the transition metal precursor and the lithium raw material may be mixed in an amount such that a molar ratio of the total transition metal (Ni+Co+Mn):Li is 1:1.05 to 1:2, preferably 1:1.1 to 1:1.8, and more preferably 1:1.25 to 1:1.8.

Meanwhile, the firing may be performed at 600° C. to 1000° C. or 700° C. to 950° C., and the firing may take 5 hours to 30 hours or 5 hours to 20 hours. In addition, the firing atmosphere may be an atmospheric atmosphere or an oxygen atmosphere, and for example, may be an atmosphere containing oxygen in an amount of 20% to 100% by volume.

Meanwhile, the positive electrode active material layer may further include a conductive material and a binder, in addition to a positive electrode active material.

The conductive material may be, for example, spherical or flaky graphite; a carbon-based material such as carbon black, acetylene black, Ketjen black, channel black, furnace black, lamp black, thermal black, carbon fiber, single-walled carbon nanotube, and multi-walled carbon nanotube; metal powder or metal fiber such as copper, nickel, aluminum, and silver; a conductive whisker such as a zinc oxide whisker and a potassium titanate whisker; a conductive metal oxide such as a titanium oxide; or a conductive polymer such as a polyphenylene derivative, and any one thereof or a mixture of two or more thereof may be used. The conductive material may be included in an amount of 0.1 wt % to 20 wt %, 1 wt % to 20 wt %, or 1 wt % to 10 wt %, with respect to a total weight of the positive electrode active material layer.

In addition, the binder may be, for example, polyvinylidene fluoride (PVDF), a polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, polytetrafluoroethylene, polyethylene, polypropylene, ethylene-propylene-diene monomer rubber (EPDM rubber), sulfonated EPDM, styrene-butadiene rubber (SBR), fluorine rubber, or various copolymers thereof, and any one thereof or a mixture of two or more thereof may be used. The binder may be included in an amount of 1 wt % to 20 wt %, 2 wt % to 20 wt %, or 2 wt % to 10 wt %, with respect to a total weight of the positive electrode active material layer.

Meanwhile, the positive electrode according to the present disclosure may have an electrode density of about 2.5 g/cc to 3.8 g/cc, 2.5 g/cc to 3.5 g/cc, or 3.0 g/cc to 3.3 g/cc. When the electrode density of the positive electrode satisfies the above range, high energy density may be obtained.

As described above, in the lithium secondary battery of the present disclosure to which an overlithiated manganese-based oxide represented by Formula 1 is applied as a positive electrode active material, the cell is stably driven even when charge termination voltage is set as high as 4.3 V to 4.5 V upon battery driving, and high capacity may thus be obtained.

FIG. 1 shows a charge/discharge profile of a half-cell manufactured using a positive electrode that uses an overlithiated manganese-based oxide as a positive electrode active material. As shown in FIG. 1, it is seen that the positive electrode using an overlithiated manganese-based oxide as a positive electrode active material generates an excess of lithium at a high voltage of 4.6 V or more, and is stably driven at a voltage of 4.3 V or more.

Negative Electrode

A negative electrode according to the present disclosure includes a silicon-based negative electrode active material as a negative electrode active material. To be specific, the negative electrode according to the present disclosure may include a negative electrode collector and a negative electrode active material layer formed on at least one surface of the negative electrode collector, and the negative electrode active material layer may include a silicon-based negative electrode active material as a negative electrode active material.

A silicon-based negative electrode active material has a higher theoretical capacity than a carbon-based negative electrode active material and has a faster reaction with lithium, and accordingly, when the silicon-based negative electrode active material is included in the negative electrode, energy density and quick charging performance are improved. However, the silicon-based negative electrode active material has a large irreversible capacity and a large volume expansion upon charge/discharge, and thus shows inferior lifespan characteristics. In particular, when the silicon-based negative electrode active material is used in combination with an overlithiated manganese-based oxide in which an oxygen-redox reaction takes place, lifespan characteristics are further deteriorated. In addition, when a silicon-based negative electrode active material and a carbon-based negative electrode active material are mixed and used, non-uniformity is caused in a negative electrode due to the difference in reaction rate between the silicon-based negative electrode active material and the carbon-based negative electrode active material, resulting in negative electrode degradation. However, as in the present disclosure, when an overlithiated manganese-based oxide with a controlled Co content, and a silicon-based negative electrode active material are used in combination, an oxygen-redox reaction is reduced to minimize deterioration in lifespan characteristics, and to obtain excellent energy density and quick charging performance.

The silicon-based negative electrode active material may be, for example, Si, SiOw ($0<w\leq2$), Si—C composite, Si-$M^a$ alloy ($M^a$ is at least one selected from the group consisting of Al, Sn, Mg, Cu, Fe, Pb, Zn, Mn, Cr, Ti, and Ni), or a combination thereof.

Meanwhile, the silicon-based negative electrode active material may be doped with Mb metal, as needed, and in this case, the Mb metal may be a Group 1 alkali metal element and/or a Group 2 alkaline earth metal element, for example, Li, Mg, or the like. To be specific, the silicon-based negative electrode active material may be Si doped with Mb metal, SiOw ($0<w\leq2$), Si—C composite, or the like.

In the case of the metal-doped silicon-based negative electrode active material, the active material may have reduced capacity due to the doping element, but have high efficiency, and thus obtain high energy density.

In addition, the silicon-based negative electrode active material, as needed, may further include a carbon coating layer on a particle surface. In this case, the carbon coating amount may be 20 wt % or less, preferably 0.1 wt % to 20 wt %, with respect to a total weight of the silicon-based negative electrode active material. When carbon coating is applied, the silicon surface may have increased electrical conductivity, thereby improving uniformity of an SEI layer, and improving initial efficiency and lifespan characteristics.

The carbon coating layer may be formed through a method such as dry coating, wet coating, chemical vapor deposition (CVD), physical vapor deposition (PVD), or atomic layer deposition (ALD).

Meanwhile, the silicon-based negative electrode active material preferably has a capacity of 1000 mAh/g to 4000 mAh/g, preferably 1000 mAh/g to 3800 mAh/g, and more preferably 1200 mAh/g to 3800 mAh/g. When the silicon-based negative electrode active material satisfying the above capacity range is used, high capacity characteristics may be obtained.

In addition, the silicon-based negative electrode active material may have an initial efficiency of 60% to 95%, 70% to 95%, and preferably 75% to 95%. The initial efficiency of the silicon-based negative electrode active material indicates percentage of discharge capacity to charge capacity measured by manufacturing a half-cell with a negative electrode using 100% silicon-based negative electrode active material as a negative electrode active material, and a lithium counter electrode, and then performing charge/discharge between 0.01 V and 1.5 V at 0.1 C-rate. When the initial efficiency of the silicon-based negative electrode active material satisfies the above range, lithium provided from the positive electrode may be reversibly used, and excellent quick charging performance may be obtained.

In addition, the silicon-based negative electrode active material may have a particle size $D_{50}$ of 3 μm to 8 μm, preferably 4 μm to 7 μm, and $D_{min}$ to $D_{max}$ may be 0.01 μm to 30 μm, preferably 0.01 μm to 20 μm, and more preferably 0.5 μm to 15 μm. When the particle size of the silicon-based negative electrode active material satisfies the above range, sufficient electrode density may be secured through the silicon-based negative electrode active material alone or the silicon-based negative electrode active material mixed with the carbon-based negative electrode active material.

In addition, the negative electrode, as needed, may further include a carbon-based negative electrode active material as a negative electrode active material. The carbon-based negative electrode active material may be, for example, artificial graphite, natural graphite, graphitized carbon fiber, amorphous carbon, soft carbon, hard carbon, or the like, but is not limited thereto.

Meanwhile, the silicon-based negative electrode active material may be included in an amount of 1 wt % to 100 wt %, 1 wt % to 50 wt %, 1 wt % to 30 wt %, 1 wt % to 15 wt %, 10 wt % to 70 wt %, or 10 wt % to 50 wt %, with respect to a total weight of the negative electrode active material.

The carbon-based negative electrode active material may be included in an amount of 0 wt % to 99 wt %, 50 wt % to 99 wt %, 70 wt % to 99 wt %, 85 wt % to 99 wt %, 30 wt % to 90 wt %, or 50 wt % to 90 wt %, with respect to a total weight of the negative electrode active material.

Meanwhile, in the lithium secondary battery of the present disclosure, it is preferable to configure the N/P ratio, which is the ratio of negative electrode discharge capacity to positive electrode discharge capacity, differently depending on the type of the negative electrode active material used.

For example, when a mixture of SiO and a carbon-based negative electrode active material is used as a negative electrode active material, the N/P ratio may be 100% to 150%, preferably 100% to 140%, and more preferably 100% to 120%. When the negative electrode discharge capacity with respect to the positive electrode discharge capacity is out of the above range, balance between the positive electrode and the negative electrode is not secured, and lifespan characteristics may thus be deteriorated or lithium precipitation may take place.

In addition, when 100% of Si is used as a negative electrode active material, the N/P ratio may be 150% to 300%, preferably 160% to 300%, and more preferably 180% to 300%. When the negative electrode discharge capacity with respect to the positive electrode discharge capacity is out of the above range, balance between the positive electrode and the negative electrode is not secured, and lifespan characteristics may thus be deteriorated or lithium precipitation may take place.

Meanwhile, the negative electrode active material layer may further include a conductive material and a binder, as needed.

The conductive material may be, for example, spherical or flaky graphite; a carbon-based material such as carbon black, acetylene black, Ketjen black, channel black, furnace black, lamp black, thermal black, carbon fiber, single-walled carbon nanotube, and multi-walled carbon nanotube; metal powder or metal fiber such as copper, nickel, aluminum, and silver; a conductive whisker such as a zinc oxide whisker and a potassium titanate whisker; a conductive metal oxide such as a titanium oxide; or a conductive polymer such as a polyphenylene derivative, and any one thereof or a mixture of two or more thereof may be used. The conductive material may be included in an amount of 0.1 wt % to 30 wt %, wt % to 20 wt %, or 0.1 wt % to 10 wt %, with respect to a total weight of the negative electrode active material layer.

Preferably, a single-walled carbon nanotube may be used as the conductive material. When a carbon nanotube is used as a conductive material, a wide conductive path is formed to increase durability and reduce resistance, thereby obtaining excellent lifespan characteristics.

FIG. 2 is an image showing formation of a conductive path on a surface of a negative electrode active material when a single-walled carbon nanotube is used as a conductive material, and FIG. 3 is an image showing formation of a conductive path on a surface of a negative electrode active material when a multi-walled carbon nanotube is used as a conductive material.

As shown in FIGS. 2 and 3, when the single-walled carbon nanotube is used as a conductive material, the conductive path is evenly formed on the surface of the negative electrode active material, thereby improving cycle characteristics.

In addition, the binder may be, for example, polyvinylidene fluoride (PVDF), a polyvinylidene fluoride-hexafluoropropylene copolymer (PVDF-co-HFP), polyvinyl alcohol, polyacrylic acid, polyacrylamide, polyacrylonitrile, carboxymethyl cellulose (CMC), starch, hydroxypropyl cellulose, regenerated cellulose, polyvinylpyrrolidone, polytetrafluoroethylene, polyethylene, polypropylene, ethylene-propylene-diene monomer rubber (EPDM rubber), sulfonated EPDM, styrene-butadiene rubber (SBR), fluorine rubber, or various copolymers thereof, and any one thereof or a mixture of two or more thereof may be used. The binder may be included in an amount of 1 wt % to 20 wt %, 2 wt % to 20 wt %, or 2 wt % to 10 wt %, with respect to a total weight of the negative electrode active material layer.

Meanwhile, the negative electrode may have a multi-layer structure in which a negative electrode active material layer is composed of a single layer or two or more layers. For example, the negative electrode may include a first negative electrode active material layer formed on a negative electrode collector, and a second negative electrode active material layer formed on a first negative electrode active material.

When the negative electrode active material layer has a multi-layer structure composed of two or more layers, each layer may have different types and/or contents of the negative electrode active material, the binder, and/or the conductive material.

For example, in the first negative electrode active material layer (lower layer), the content of a carbon-based negative electrode active material in the total negative electrode active material may be higher than that of the second negative electrode active material layer (upper layer), in the second negative electrode active material layer, the content of a silicon-based negative electrode active material in the total negative electrode active material may be higher than that of the first negative electrode active material layer, or the content of the conductive material in the second negative electrode active material layer (upper layer) may be higher than that of the first negative electrode active material layer (upper layer).

As described above, by forming the negative electrode active material layer having a multi-layer structure and varying the composition of each layer, performance characteristics of batteries may be improved. For example, when the content of the conductive material or the silicon-based negative electrode active material in the upper layer is higher than that in the lower layer, quick charging performance may be improved.

Meanwhile, the negative electrode active material layer may have a porosity of 20% to 70% or 20% to 50%. When porosity of the negative electrode active material layer is too small, electrolyte impregnability may be reduced to deteriorate lithium mobility, and when the porosity is too large, energy density may be reduced.

Separator

In the lithium secondary battery of the present disclosure, a separator is to separate the negative electrode and the positive electrode and to provide a movement path for lithium ions. Any separator may be used without particular limitation as long as it is typically used as a separator in a lithium secondary battery. Particularly, a separator having high moisture-retention ability for an electrolyte as well as low resistance to the movement of electrolyte ions is preferable. Specifically, a porous polymer film, for example, a porous polymer film manufactured using a polyolefin-based polymer such as an ethylene homopolymer, a propylene homopolymer, an ethylene/butene copolymer, an ethylene/hexene copolymer, and an ethylene/methacrylate copolymer, or a laminated structure having two or more layers thereof may be used. In addition, a typical porous non-woven fabric, for example, a non-woven fabric formed of glass fiber having a high melting point, polyethylene terephthalate fiber, or the like may be used. Furthermore, a coated separator including a ceramic component or a polymer component may be used to secure heat resistance or mechanical strength, and the separator having a single layer or multilayer structure may be selectively used.

Electrolyte

In addition, the electrolyte used in the present disclosure may be an organic liquid electrolyte, an inorganic liquid electrolyte, a solid polymer electrolyte, a gel-type polymer electrolyte, a solid inorganic electrolyte, a molten-type inorganic electrolyte, and the like, all of which may be used in the manufacturing of a lithium secondary battery, but is not limited thereto.

Specifically, the electrolyte may include an organic solvent and a lithium salt.

Any organic solvent may be used without particular limitation as long as it may serve as a medium through which ions involved in an electrochemical reaction of a battery may move. Specifically, as the organic solvent, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2 to C20 hydrocarbon group and may include a double-bond aromatic ring or ether bond); amides such as dimethylformamide; dioxolanes such as 1,3-dioxolane; or sulfolanes may be used.

Any compound may be used as the lithium salt without particular limitation as long as it may provide lithium ions used in a lithium secondary battery. To be specific, an anion of the lithium salt may be at least one selected from the group consisting of $F^-$, $Cl^-$, $Br^-$, $I^-$, $NO_3^-$, $N(CN)_2^-$, $BF_4^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$, and as the lithium salt, $LiPF_6$, $LiN(FSO_2)_2$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, $LiCl$, $LiI$, or $LiB(C_2O_4)_2$ may be used. The lithium salt may be used in a concentration range of 0.1 M to 5.0 M.

In addition, additives may be included in the electrolyte for the purpose of increasing battery life, suppressing capacity reduction, preventing gas generation, and the like. As the additive, various additives used in the art, for example, fluoroethylene carbonate (FEC), vinylene carbonate (VC), vinylethylene carbonate (VEC), ethylene sulfate (ESa), lithium difluorophosphate (LiPO2F2), lithium bisoxalatoborate (LiBOB), lithium tetrafluoro borate (LiBF4), lithium difluorooxalato borate (LiDFOB), lithium difluorobisoxalatophosphate (LiDFBP), lithium tetrafluorooxalatophosphate (LiTFOP), lithium methyl sulfate (LiMS), lithium ethyl sulfate (LiES) propanesultone (PS), propensultone (PRS), succinonitrile (SN), adiponitrile (AND), 1,3,6-hexanetricarbonitrile (HTCN), 1,4-dicyano-2-butene (DCB), fluorobenzene (FB), ethyldi(prop-2-yn-1-yl) phosphate (EDP), 5-methyl-5propargyloxylcarbonyl-1,3-dioxane-2-one (MPOD), a compound represented by Formula A below (e.g., cyanoethyl polyvinyl alcohol, PVA-CN), a compound represented by Formula B (e.g., heptafluorobutyric cyanoethyl polyvinyl alcohol, PF-PVA-CN), a compound represented by Formula C (e.g., propargyl 1H-imidazole-1-carboxylate, PAC), and/or a compound represented by Formula D (e.g., arylimidazole such as C6H8N2), and the like may be used.

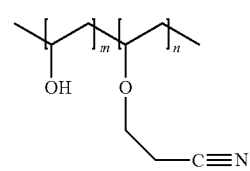

[Formula A]

In Formula A above, n and m are each independently an integer of 1 to 100.

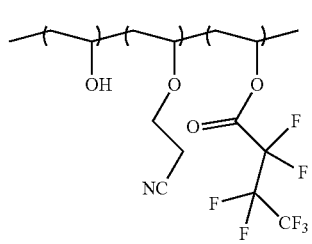

[Formula B]

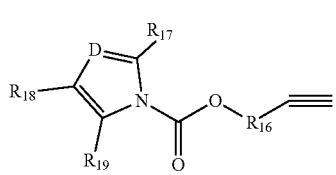

[Formula C]

In Formula C above, $R_{16}$ is a linear or non-linear alkylene group having 1 to 3 carbon atoms, $R_{17}$ to $R_{19}$ are each independently at least one selected from the group consisting of hydrogen, an alkyl group having 1 to 3 carbon atoms, and —CN, and D is CH or N.

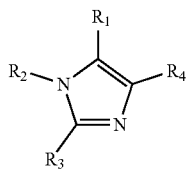
[Formula D]

In Formula D above, $R_1$, $R_2$, $R_3$, and $R_4$ may each independently include hydrogen; or an alkyl group having 1 to 5 carbon atoms, a cyano group (CN), an allyl group, a propargyl group, an amine group, a phosphate group, an ether group, a benzene group, a cyclohexyl group, a silyl group, an isocyanate group (—NCO), a fluorine group (—F).

Preferably, compounds acting as oxygen scavengers may be used as the additive. Tris tri(methylsilyl)phosphite (TMSPi), tris trimethyl phosphite (TMPi), tris(2,2,2-trifluoroethyl)phosphite (TTFP), and other phosphite-based structures (see Formula E), tris tri(methylsilyl)phosphate (TMSPa), polyphosphoric acid trimethylsilyl ester (PPSE), tris(pentafluorophenyl)borane (TPFPB), coumarin-3-carbonitrile (CMCN), 7-ethynylcoumarin (ECM), 3-acetylcoumarin (AcCM), 3-[(trimethylsilyl)oxyl]-2H-1-benzopyran-2-one (TMSOCM), 3-(trimethylsilyl)coumarin (TMSCM), 3-(2-propyn-1-yloxyl)-2H-1-benzopyran-2-one (POCM), 2-propyn-1-yl 2-oxo-2H-1-benzopyran-3-carboxylate (OBCM), and compounds containing a coumarin structure (see Formula F), and the like may be used as the compounds acting as oxygen scavengers.

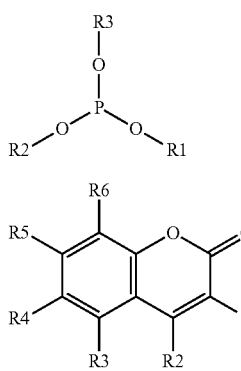
[Formula E]

[Formula F]

In Formulas E and F, R1 to R6 may each independently include cyan (nitrile), fluoro (F), ether (C—O—C), carboxyl (O—C=O), trimethylsilyl (-TMS), isocyanate (—NCO), and/or isothiocyanate (—NCS) functional groups, which are a substituted or unsubstituted alkenyl group having 2 to carbon atoms and a substituted or unsubstituted alkynyl group having 2 to 20 carbon atoms.

The lithium secondary battery of the present disclosure configured as described above may compensate for irreversible capacity of a silicon-based negative electrode active material, using lithium generated during a $Li_2MnO_3$ phase activation process by performing the activation process at a high voltage of 4.6 V or more.

The lithium secondary battery of the present disclosure configured as described above exhibits high energy density and excellent quick charging performance. To be specific, the lithium secondary battery according to the present disclosure has an energy density of 500 Wh/L or more, preferably 500 Wh/L to 1000 Wh/L, and requires 20 minutes or less for quick charging up to 80% ASOC.

EXAMPLES

Hereinafter, the present disclosure will be described in detail through specific examples.

Example 1

A positive electrode active material, a single-walled carbon nanotube, and a PVDF binder were mixed in N-methylpyrrolidone in a weight ratio of 96.0:1.0:3 to prepare a positive electrode slurry. In this case, $Li_{1.143}[Ni_{0.35}Mn_{0.65}]_{0.857}O_2$ coated with Al (1500 ppm) was used as a positive electrode active material.

The positive electrode slurry was applied onto an aluminum collector sheet, dried, and then rolled to prepare a positive electrode.

A negative electrode active material, a single-walled carbon nanotube, styrene-butadiene rubber (SBR), and carboxymethyl cellulose (CMC) were mixed in water in a weight ratio of 96.2:0.8:2:1 to prepare a first negative electrode slurry.

In addition, a negative electrode active material, a single-walled carbon nanotube, styrene-butadiene rubber (SBR), and carboxymethyl cellulose (CMC) were mixed in water in a weight ratio of 93.8:1.2:4:1 to prepare a second negative electrode slurry.

As a negative electrode active material of the first negative electrode slurry and the second negative electrode slurry, graphite having an initial efficiency of 94% and SiOx having an initial efficiency of 82% were mixed so that the weight ratio of graphite and SiOx(SiOx:C) was 5:95, and then used.

The first negative electrode slurry was applied onto a copper collector sheet and dried, and then the second negative electrode slurry was applied thereon, dried, and then rolled to prepare a double-layered negative electrode.

Meanwhile, the positive electrode and the negative electrode were prepared such that the ratio of negative electrode discharge capacity to positive electrode discharge capacity (N/P ratio) was 115% by controlling the loading amount.

A separator was interposed between the positive electrode and the negative electrode prepared above to produce an electrode assembly, and the electrode assembly was inserted into a battery case. Thereafter, an electrolyte was injected and performed activation process by charging until 4.6V with a constant current of 0.1 C and then discharging to 2.0V with a constant current of 0.1 C at 45° C. to produce a lithium secondary battery.

Example 2

A lithium secondary battery was manufactured in the same manner as in Example 1, except that $Li_{1.143}[Ni_{0.34}Co_{0.02}Mn_{0.64}]_{0.857}O_2$ coated with Al (1500 ppm) was used instead of $Li_{1.143}[Ni_{0.35}Mn_{0.65}]_{0.857}O_2$ coated with Al (1500 ppm) as a positive electrode active material.

Example 3

A lithium secondary battery was manufactured in the same manner as in Example 1, except that $Li_{1.143}[Ni_{0.34}Co_{0.02}Mn_{0.64}]_{0.857}O_2$ not coated with Al was used instead of $Li_{1.143}[Ni_{0.35}Mn_{0.65}]_{0.857}O_2$ coated with Al (1500 ppm) as a positive electrode active material.

Example 4

A lithium secondary battery was manufactured in the same manner as in Example 1, except that $Li_{1.130}[Ni_{0.35}Mn_{0.65}]_{0.870}O_2$ coated with Al (1500 ppm) was used instead of $Li_{1.143}[Ni_{0.35}Mn_{0.65}]_{0.857}O_2$ coated with Al (1500 ppm) as a positive electrode active material.

Example 5

A lithium secondary battery was manufactured in the same manner as in Example 1, except that $Li_{1.143}[Ni_{0.33}Mn_{0.67}]_{0.857}O_2$ coated with Al (1500 ppm) was used instead of $Li_{1.143}[Ni_{0.35}Mn_{0.65}]_{0.857}O_2$ coated with Al (1500 ppm) as a positive electrode active material, and a multi-walled carbon nanotube was used instead of a single-walled carbon nanotube upon preparing a first negative electrode slurry and a second negative electrode slurry.

Example 6

A lithium secondary battery was manufactured in the same manner as in Example 1, except that $Li_{1.143}[Ni_{0.33}Mn_{0.67}]_{0.857}O_2$ coated with Al (1500 ppm) was used instead of $Li_{1.143}[Ni_{0.35}Mn_{0.65}]_{0.857}O_2$ coated with Al (1500 ppm) as a positive electrode active material, and that a second negative electrode slurry was applied onto a copper collector sheet, dried, and then rolled to prepare a single-layered negative electrode.

Example 7

A lithium secondary battery was manufactured in the same manner as in Example 1, except that $Li_{1.143}[Ni_{0.33}Mn_{0.67}]_{0.857}O_2$ coated with Al (1500 ppm) was used instead of $Li_{1.143}[Ni_{0.35}Mn_{0.65}]_{0.857}O_2$ coated with Al (1500 ppm) as a positive electrode active material, and that the loading amount of a positive electrode and a negative electrode was adjusted such that the ratio of negative discharge capacity to positive discharge capacity (N/P ratio) was 120%.

Example 8

A lithium secondary battery was manufactured in the same manner as in Example 1, except that $Li_{1.143}[Ni_{0.33}Mn_{0.67}]_{0.857}O_2$ coated with Al (1500 ppm) was used instead of $Li_{1.143}[Ni_{0.35}Mn_{0.65}]_{0.857}O_2$ coated with Al (1500 ppm) as a positive electrode active material, and that as a negative electrode active material of a first negative electrode slurry and a second negative electrode slurry, SiOx and graphite were mixed in a weight ratio (SiOx:C) of 10:90.

Example 9

A lithium secondary battery was manufactured in the same manner as in Example 1, except that $Li_{1.143}[Ni_{0.33}Mn_{0.67}]_{0.857}O_2$ coated with Al (1500 ppm) was used instead of $Li_{1.143}[Ni_{0.35}Mn_{0.65}]_{0.857}O_2$ coated with Al (1500 ppm) as a positive electrode active material, SiC was used alone as a negative electrode active material of a first negative electrode slurry and a second negative electrode slurry, and the ratio of negative electrode discharge capacity to positive electrode discharge capacity (N/P ratio) was 250%.

Comparative Example 1

A lithium secondary battery was manufactured in the same manner as in Example 1, except that $Li_{1.143}[Ni_{0.22}Co_{0.12}Mn_{0.66}]_{0.857}O_2$ coated with Al (1500 ppm) was used instead of $Li_{1.143}[Ni_{0.35}Mn_{0.65}]_{0.857}O_2$ coated with Al (1500 ppm) as a positive electrode active material.

Comparative Example 2

A lithium secondary battery was manufactured in the same manner as in Example 1, except that $LiNi_{0.80}Co_{0.10}Mn_{0.10}O_2$ coated with Al (1500 ppm) was used instead of $Li_{1.143}[Ni_{0.35}Mn_{0.65}]_{0.857}O_2$ coated with Al (1500 ppm) as a positive electrode active material.

Comparative Example 3

A lithium secondary battery was manufactured in the same manner as in Example 1, except that $Li_{1.143}[Ni_{0.33}Mn_{0.67}]_{0.857}O_2$ coated with Al (1500 ppm) was used instead of $Li_{1.143}[Ni_{0.35}Mn_{0.65}]_{0.857}O_2$ coated with Al (1500 ppm) as a positive electrode active material, graphite was used alone as a negative electrode active material of a first negative electrode slurry and a second negative electrode slurry, and the ratio of negative electrode discharge capacity to positive electrode discharge capacity (N/P ratio) was 112%.

TABLE 2

| | Positive electrode | | | | Negative electrode | |
| --- | --- | --- | --- | --- | --- | --- |
| | Active material composition | Molar ratio of Li/Me | Molar ratio of Ni:Mn:Co | Coating | Active material composition | Structure |
| Example 1 | $Li_{1.143}[Ni_{0.35}Mn_{0.65}]_{0.857}O_2$ | 1.33 | 35:65:0 | Al 1500 ppm | SiOx:C = 5:95 | Double layer |
| Example 2 | $Li_{1.143}[Ni_{0.34}Co_{0.02}Mn_{0.64}]_{0.857}O_2$ | 1.33 | 34:64:2 | Al 1500 ppm | SiOx:C = 5:95 | Double layer |
| Example 3 | $Li_{1.143}[Ni_{0.34}Co_{0.02}Mn_{0.64}]_{0.857}O_2$ | 1.33 | 34:64:2 | — | SiOx:C = 5:95 | Double layer |
| Example 4 | $Li_{1.130}[Ni_{0.35}Mn_{0.65}]_{0.870}O_2$ | 1.3 | 35:65:0 | Al 1500 ppm | SiOx:C = 5:95 | Double layer |
| Example 5 | $Li_{1.143}[Ni_{0.33}Mn_{0.67}]_{0.857}O_2$ | 1.33 | 33:67:0 | Al 1500 ppm | SiOx:C = 5:95 | Double layer |
| Example 6 | $Li_{1.143}[Ni_{0.33}Mn_{0.67}]_{0.857}O_2$ | 1.33 | 33:67:0 | Al 1500 ppm | SiOx:C = 5:95 | Single layer |

TABLE 2-continued

| | Positive electrode | | | | Negative electrode | |
|---|---|---|---|---|---|---|
| | Active material composition | Molar ratio of Li/Me | Molar ratio of Ni:Mn:Co | Coating | Active material composition | Structure |
| Example 7 | $Li_{1.143}[Ni_{0.33}Mn_{0.67}]_{0.857}O_2$ | 1.33 | 33:67:0 | Al 1500 ppm | SiOx:C = 5:95 | Double layer |
| Example 8 | $Li_{1.143}[Ni_{0.33}Mn_{0.67}]_{0.857}O_2$ | 1.33 | 33:67:0 | Al 1500 ppm | SiOx:C = 10:90 | Double layer |
| Example 9 | $Li_{1.143}[Ni_{0.33}Mn_{0.67}]_{0.857}O_2$ | 1.33 | 33:67:0 | Al 1500 ppm | SiC = 100% | Single layer |
| Comparative Example 1 | $Li_{1.143}[Ni_{0.22}CO_{0.12}Mn_{0.66}]_{0.857}O_2$ | 1.33 | 22:66:12 | Al 1500 ppm | SiOx + C | Double layer |
| Comparative Example 2 | $LiNi_{0.8}CO_{0.1}Mn_{0.1}O_2$ | 1 | 80:10:10 | Al 1500 ppm | SiOx + C | Double layer |
| Comparative Example 3 | $Li_{1.143}[Ni_{0.33}Mn_{0.67}]_{0.857}O_2$ | 1.33 | 33:67:0 | Al 1500 ppm | Graphite = 100% | Double layer |

Experimental Example 1

Irreversible capacity of the positive electrodes prepared in Examples and Comparative Examples and initial efficiency of the negative electrodes were measured as follows. The measurement results are shown in Table 3 below.

<Measurement of Irreversible Capacity of Positive Electrode>

A half-cell was prepared with each positive electrode prepared in Examples and Comparative Examples and lithium counter electrode. Then, the half-cell was charged up to 4.65 V with a constant current of 0.1 C, and then discharged down to 2.0 V with a constant current of 0.1 C at 45° C. to perform an activation process. Then, charge capacity C1 in the activation process was measured.

Then, the half-cell in which the activation process was completed were charged up to 4.35 V with a constant current of 0.1 C, and discharged down to 2.5 V with a constant current of 0.1 C at 25° C. to measure cycle discharge capacity D1. The percentage of the discharge capacity D1 with respect to the charge capacity C1 upon the activation process was calculated to measure irreversible capacity of the positive electrode.

<Measurement of Initial Efficiency of Negative Electrode>

A half-cell was prepared with the each negative electrode prepared in Examples and Comparative Examples and the lithium counter electrode, and after the current was applied up to 0.005 V with a constant current of 0.1 C at 25° C., the half-cell was charged up to 0.05 C with a constant potential of 0.005 V, and discharged down to 1.5 V with a constant current of 0.1 C, and then the percentage of the discharge capacity with respect to the charge capacity was measured.

TABLE 3

| | Positive electrode | | | Negative Electrode | |
|---|---|---|---|---|---|
| | Charge capacity when activated (mAh/g) | Cycle discharge capacity (mAh/g) | Irreversible capacity (%) | Discharge capacity (mAh/g) | Initial efficiency (%) |
| Example 1 | 291.4 | 210 | 27.92% | 417 | 93.40% |
| Example 2 | 298.3 | 219 | 26.58% | 417 | 93.40% |
| Example 3 | 289.7 | 205 | 29.24% | 417 | 93.40% |
| Example 4 | 290.8 | 214 | 26.41% | 417 | 93.40% |
| Example 5 | 284.9 | 205 | 28.04% | 420 | 92.90% |
| Example 6 | 284.9 | 205 | 28.04% | 415 | 92.20% |
| Example 7 | 284.9 | 205 | 28.04% | 417 | 93.40% |
| Example 8 | 284.9 | 205 | 28.04% | 471 | 92.80% |
| Example 9 | 284.9 | 205 | 28.04% | 1900 | 90.90% |
| Comparative Example 1 | 277.8 | 183 | 34.13% | 417 | 93.40% |
| Comparative Example 2 | 258.2 | 221 | 14.42% | 417 | 93.40% |
| Comparative Example 3 | 291.4 | 215 | 26.21% | 357 | 93.80% |

Experimental Example 2: No. of Cycles to Reach 80% Life

Charging and discharging in which the secondary batteries prepared in Examples and Comparative Examples are charged up to 4.2 V with a constant current of 0.33 C and discharged down to 2.5 V with a constant current of 0.33 C at 25° C. was repeated as one cycle to measure the number of times the discharge capacity reaches 80% after a cycle relative to the initial discharge capacity. The measurement results are shown in Table 4 below.

Experimental Example 3: Quick Charging Performance

The secondary batteries prepared in Examples and Comparative Examples were charged through a step charging method, and the time (unit: min.) required to be charged up to 80% SOC was measured. In this case, the step charging is a method of sequentially charging by lowering the charging rate when a constant voltage (4.35 V) is reached after charging at a constant charging rate (C-rate), and in the present disclosure, charging was carried out sequentially under the C-rate condition of 3 C→2.5 C→2 C→1.5 C→1 C→0.5 C→0.1 C. The measurement results are shown in Table 4 below.

Experimental Example 4: Energy Density (Unit: Wh/L)

The secondary batteries prepared in Examples and Comparative Examples were charged and discharged in the voltage range of 4.35 V to 2.5 V and measure the energy density of the secondary batteries. The energy density was calculated by multiplying the discharge capacity by the average voltage and then dividing it by the unit volume of the secondary battery, and the average voltage is a value obtained by dividing the integrated value of the curve of the capacity-voltage profile by the capacity. The measurement results are shown in Table 4 below.

TABLE 4

|  | No. of cycles to reach 80% life | Quick Charging, (min) | Energy density (Wh/L) |
| --- | --- | --- | --- |
| Example 1 | 671 | 19.5 | 523 |
| Example 2 | 648 | 19.2 | 528 |
| Example 3 | 696 | 19.7 | 532 |
| Example 4 | 676 | 19.5 | 525 |
| Example 5 | 644 | 19.9 | 528 |
| Example 6 | 685 | 20.0 | 530 |
| Example 7 | 690 | 18.8 | 530 |
| Example 8 | 652 | 18.5 | 524 |
| Example 9 | 576 | 15.4 | 476 |
| Comparative Example 1 | 601 | 22.3 | 513 |
| Comparative Example 2 | 711 | 25 | 520 |
| Comparative Example 3 | 530 | 31 | 503 |

As shown in Table 4 above, the lithium secondary batteries of Examples 1 to 8, in which an overlithiated manganese-based oxide having a Co content of less than 10 mol % was applied as a positive electrode active material, and a mixture of SiOx and graphite was applied as a negative electrode active material exhibited excellent quick charging performance of less than 20 minutes, excellent lifespan characteristics with 80% or more capacity retention upon charge/recharge of 640 times or more, and excellent energy density of 520 Wh/L or more.

The lithium secondary battery of Example 9 to which 100% of SiC was applied as a negative electrode active material exhibited slightly reduced capacity and lifespan, but showed fairly excellent quick charging performance.

Meanwhile, the lithium secondary battery of Comparative Example 1 to which an overlithiated manganese-based oxide having a Co content of 10 mol % or more was applied failed to satisfy the quick charging performance of less than 20 minutes, and exhibited lower lifespan and energy density than the lithium secondary batteries of Examples.

The lithium secondary battery of Comparative Example 2 to which NCM 811, instead of an overlithiated manganese-based oxide, was applied as a positive electrode active material exhibited excellent lifespan but lower quick charging performance and energy density than the lithium secondary batteries of Examples.

The lithium secondary battery of Comparative Example 3 in which only graphite, which is a carbon-based negative electrode active material, was applied as a negative electrode active material exhibited lower quick charging performance, lifespan, and energy density than the lithium secondary batteries of Examples, and particularly, showed a significant deterioration in lifespan and quick charging performance.

The invention claimed is:

1. A lithium secondary battery comprising a positive electrode, a negative electrode, a separator, and an electrolyte,
   wherein the positive electrode comprises a positive electrode active material layer comprising a positive electrode active material comprising an overlithiated manganese-based oxide represented by Formula 1 below, and
   the negative electrode comprises a negative electrode active material layer comprising a silicon-based negative electrode active material, $$Li_aNi_bCo_cMn_dM_eO_2 \quad \text{[Formula 1]}$$

wherein, $1<a$, $0≤b≤0.5$, $0≤c≤0.08$, $0.5≤d<1.0$, and $0≤e≤0.2$, and M is at least one selected from the group consisting of Al, B, Co, W, Mg, V, Ti, Zn, Ga, In, Ru, Nb, Sn, Sr, and Zr,
   wherein the positive electrode has an electrode density of 2.5 g/cc to 3.8 g/cc.

2. The lithium secondary battery of claim 1, wherein in the Formula 1, $1.1≤a≤1.5$, $0.1≤b≤0.4$, $0≤c≤0.05$, $0.5≤d≤0.80$, and $0≤e≤0.1$.

3. The lithium secondary battery of claim 1, wherein the overlithiated manganese-based oxide is represented by Formula 2 below:

$$X\ Li_2MnO_3·(1-X)Li[Ni_{1-y-z-w}Mn_yCo_zM_w]O_2 \quad \text{[Formula 2]}$$

wherein M is at least one selected from the group consisting of Al, B, Co, W, Mg, V, Ti, Zn, Ga, In, Ru, Nb, Sn, Sr, and Zr, and $0.2≤X≤0.5$, $0.4≤y<1$, $0≤z≤0.08$, and $0≤w≤0.2$.

4. The lithium secondary battery of claim 1, wherein the positive electrode active material has an average particle diameter D50 of 2 μm to 10 μm.

5. The lithium secondary battery of claim 1, wherein the positive electrode active material has a BET specific surface area of 1 m²/g to 10 m²/g.

6. The lithium secondary battery of claim 1, wherein the positive electrode has an initial irreversible capacity of 5% to 70%.

7. The lithium secondary battery of claim 1, wherein the silicon-based negative electrode active material has an initial efficiency of 60% to 95%.

8. The lithium secondary battery of claim 1, wherein the negative electrode active material layer further comprises a conductive material and a binder,
wherein the conductive material comprises a single-walled carbon nanotube.

9. The lithium secondary battery of claim 1, wherein the silicon-based negative electrode active material has an average particle diameter $D_{50}$ of 3 μm to 8 μm.

10. The lithium secondary battery of claim 1, wherein the negative electrode active material layer has a porosity of 20% to 70%.

11. The lithium secondary battery of claim 1, wherein the negative electrode active material is a mixture of silicon oxide and a carbon-based negative electrode active material, and
wherein the lithium secondary battery has an N/P ratio of 100% to 150%.

12. The lithium secondary battery of claim 11, wherein the negative electrode has a multi-layer structure comprising two or more negative electrode active material layers.

13. The lithium secondary battery of claim 11, wherein the negative electrode comprises a negative electrode collector, a first negative electrode active material layer disposed on the negative electrode collector, and a second negative electrode active material layer disposed on the first negative electrode active material layer, and
wherein the second negative electrode active material layer has a higher content of conductive material than the first negative electrode active material layer.

14. The lithium secondary battery of claim 1, wherein the negative electrode active material is made of Si, and
wherein the lithium secondary battery has an N/P ratio of 150% to 300%.

15. The lithium secondary battery of claim 1, wherein the lithium secondary battery has an energy density of 500 Wh/L or greater, and requires 20 minutes or less to charge up to 80% state of charge (SOC).

* * * * *